June 12, 1923.　　　　　C. E. HINCHEY　　　　　1,458,293
DENTAL TOOL
Filed March 29, 1922
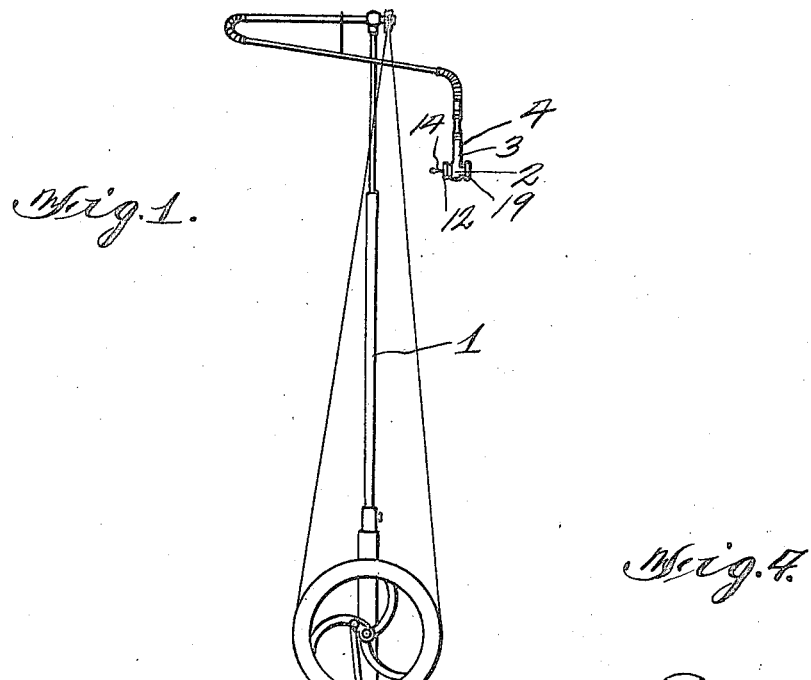
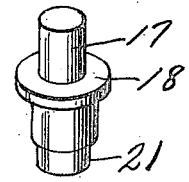
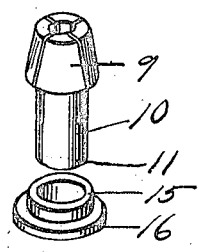
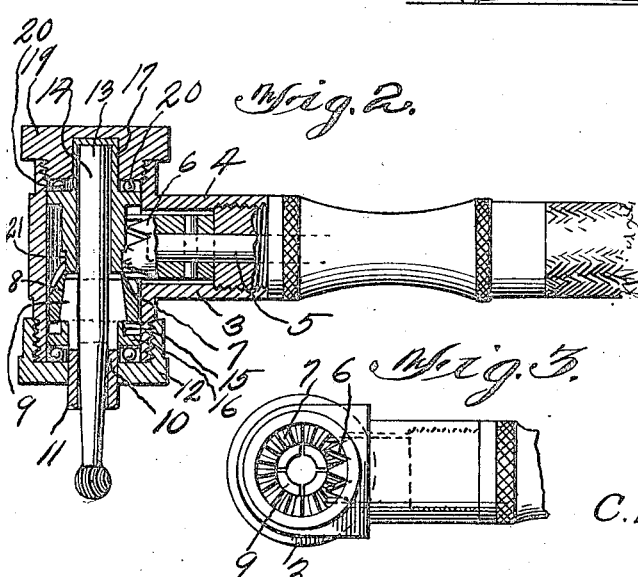
Inventor
C. E. Hinchey
By
Attorney Patented June 12, 1923.

1,458,293

UNITED STATES PATENT OFFICE.

CLAUDE E. HINCHEY, OF WEYAUGA, WISCONSIN.

DENTAL TOOL.

Application filed March 29, 1922. Serial No. 547,801.

*To all whom it may concern:*

Be it known that I, CLAUDE E. HINCHEY, a citizen of the United States, residing at Weyauga, in the county of Waupaca, State of Wisconsin, have invented a new and useful Dental Tool; and I do hereby declare the following to be a full, clear, and exact description of the invention, such as will enable others skilled in the art to which it appertains to make and use the same.

The invention relates to dental tools and has for its object to provide a tool of this character which is ball bearing and provided with a chuck for holding the drill or burr in such a manner that it will be prevented from wobbling and will be easily driven thereby reducing the cost of power to a minimum and at the same time securing the maximum efficiency for the tool.

A further object is to provide an angled dental tool comprising a casing having a driving gear, a ball bearing supported chuck disposed at a right angle to the driving gear and adapted to receive and hold a drill, said chuck being disposed in a tapered chamber of a floating driven gear, and when tightened for holding the drill frictionally engaging said float and driven gear.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a conventional form of manually operated drilling machine, showing the tool applied thereto.

Figure 2 is a vertical longitudinal sectional view through one end of the dental tool showing part of the handle in elevation.

Figure 3 is a top plan view of the tool showing the upper bearing for the drill, removed.

Figure 4 is a collective detail view of the chuck and adjacent parts.

Referring to the drawings, the numeral 1 designates a conventional form of dental drilling machine of the manually operated type and 2 the angular drilling head. The drilling head 2 comprises a T-shaped casing 3 in the arm 4 of which the drive shaft 5 is rotatably mounted. The drive shaft 5 is provided with a drive gear 6 which meshes with and revolves a floating drilling gear 7 in a tapered chamber 8 of which the tapered split end 9 of the chuck 10 is received, said chuck having a downwardly extending sleeve 11 which extends through the cap 12 threaded on the casing. It will be seen that when the shank 13 of the drill 14 is passed through the sleeve 11 of the chuck and the cap 12 tightened, the flange 15 of the annular ring 16 will force the chuck 10 upwardly into jamming engagement with the driven gear 7, which meshes with the drive gear 6 and consequently the drill 14 is held by the contraction of the tapered split portion 9 of the chuck. The upper end 13 of the drill shank is rotatably mounted in a sleeve 17, which sleeve has interposed between the flange 18 thereof and an adjustable cap screw 19, ball bearings 20, thereby anti frictionally supporting the device, if the sleeve should rotate with the drill shank. The lower end of the sleeve 17 is reduced at 21, thereby forming a guiding extension which passes into the driven gear 7 and maintains the same axially disposed. It will be seen that by adjusting the screws 12 and 19, the ball bearings may be easily and quickly adjusted and that the gripping of the drill by the tapered split portion 9 of the chuck is assured.

From the above it will be seen that an angularly shaped dental drilling head is provided which is simple in construction, ball bearing supporting and so constructed that the drill is positively held thereby insuring a steady and uniform rotation of the drill or burr.

The invention having been set forth what is claimed as new and useful is:—

1. A dental head comprising a T-shaped casing, a driving gear mounted in one of the arms of the T-shaped casing, a rotatable chuck rotatably mounted in the other arms, a driven ring gear surrounding the chuck and floatably mounted in the last named arms, said chuck being provided with a tapered split inner portion cooperating with a tapered chamber in the gear ring and forming a clutch therebetween, antifrictional bearings for supporting the chuck and adjustable caps whereby the tapered split chuck may be contracted for holding a drill and frictionally engaging within the tapered chamber of the ring gear.

2. An angled dental head, said head comprising a casing, caps threaded on opposite ends of the casing, a sleeve mounted in a bearing of one of said caps, a gear ring slidably mounted on the lower end of the sleeve, a split tapered chuck mounted in a tapered chamber of the gear ring, a flanged ring having one of its flanges in engagement with the wide portion of the chuck, ball bearings interposed between said ring and one of the caps, said chuck being provided with a sleeve slidably mounted in said last named cap, a driving gear meshing with the gear ring and ball bearings interposed between a portion of the sleeve and the threaded cap at the other end of the casing from the tapered chuck.

In testimony whereof I have signed my name to this specification in the presence of two subscribing witnesses.

CLAUDE E. HINCHEY.

Witnesses:
 LILAN PLUGE,
 CLYDE M. BOVEA.